United States Patent [19]

Utsumi

[11] Patent Number: 5,233,439
[45] Date of Patent: Aug. 3, 1993

[54] DISK PLAYER WITH IMPROVED SOUND DURING DIFFERENT SPEED VIDEO REPRODUCTIONS

[75] Inventor: Yoshihiro Utsumi, Saitama, Japan

[73] Assignee: Pioneer Electronic Corporation, Tokyo, Japan

[21] Appl. No.: 577,468

[22] Filed: Sep. 4, 1990

[30] Foreign Application Priority Data

Sep. 7, 1989 [JP] Japan .................................. 1-232096

[51] Int. Cl.$^5$ ............................................. H04N 5/781
[52] U.S. Cl. ..................................... 358/343; 358/342; 358/341; 358/907
[58] Field of Search ............... 358/335, 342, 343, 338, 358/341, 907; 360/19.1

[56] References Cited

U.S. PATENT DOCUMENTS

| | | | |
|---|---|---|---|
| 4,794,466 | 12/1988 | Andoh | 358/343 |
| 4,853,914 | 8/1989 | Okano et al. | 369/32 |
| 4,956,726 | 9/1990 | Takimoto et al. | 358/343 |

Primary Examiner—Tommy Chin
Assistant Examiner—Huy Nguyen
Attorney, Agent, or Firm—Perman & Green

[57] ABSTRACT

In a disk performance apparatus, an audio signal processor is provided so as to remove the higher components with frequency higher than the prescribed frequency of audio signals included in outputs of a reading device for reading recorded signals of a disk during still or slow picture reproducing and the lower components with frequency lower than that corresponding to the period of the track jump, and incompatibility in the auditory sensation of the reproducing sound is eliminated.

4 Claims, 2 Drawing Sheets

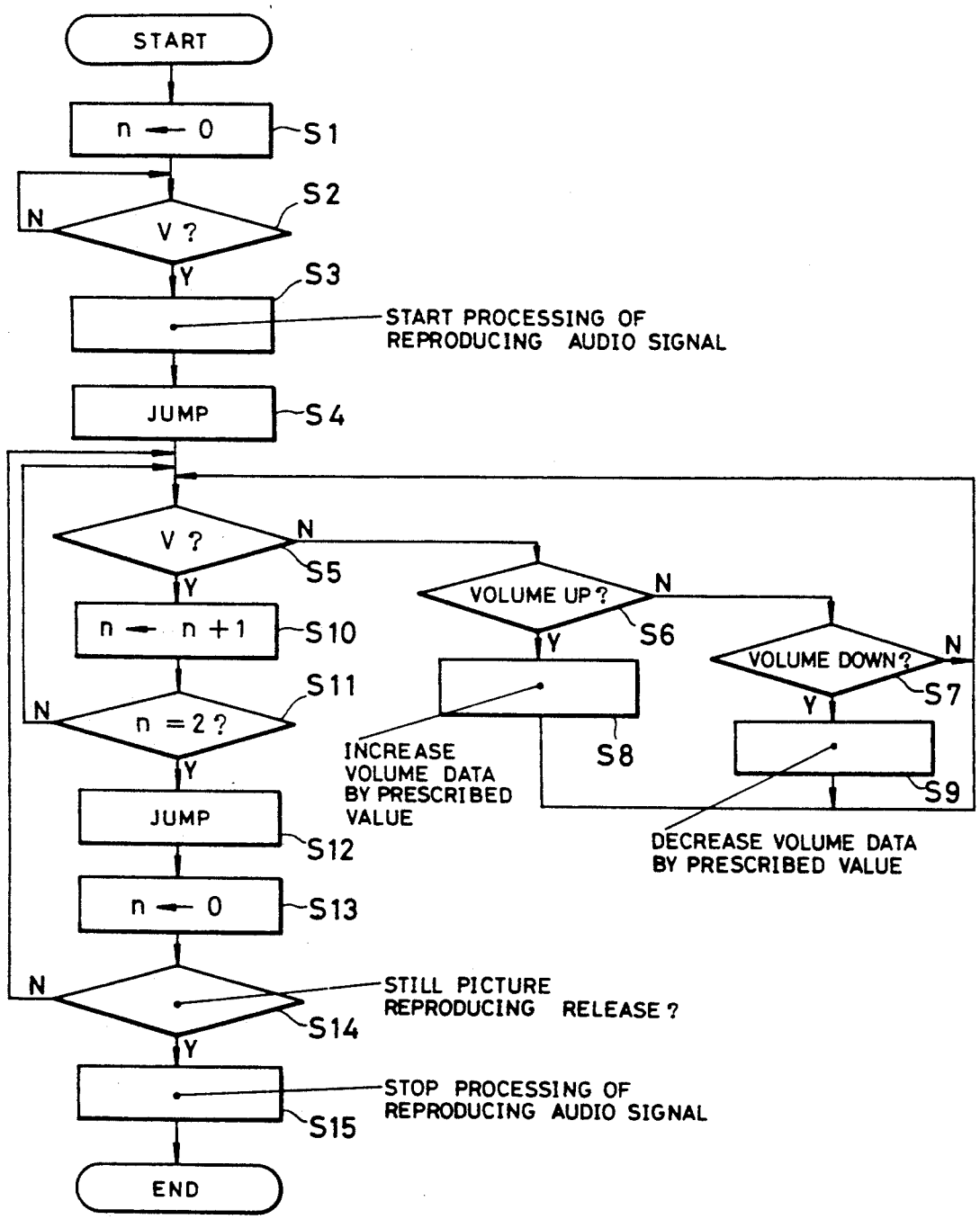

DISK PLAYER WITH IMPROVED SOUND DURING DIFFERENT SPEED VIDEO REPRODUCTIONS

BACKGROUND OF THE INVENTION

1. Field of the Invention

The present invention relates to a disk performance apparatus, and more particularly to an apparatus for recording on a disc a video signal including synchronization signals such as so-called vertical and horizontal synchronization signals (hereinafter referred to as "video format signals") together with audio signals on a disk, and for reproducing the recorded signals.

2. Description of the Related Art

A recording and reproducing system is known where video format signals subjected to frequency modulation are recorded as a file on a disk so as to enable the reproducing of a moving picture or a still picture. In such a recording and reproducing system, address signals are previously recorded as prepits on a disk for the file management, and during the recording of the video format signals the address signal based on the preaddress pits is detected from the RF signals read from the disk. The rotational speed of the disk is controlled in response to the phase difference between the detected address signal and the vertical synchronization signal in the video format signals to be recorded, and the recording is done so that one frame of the video format corresponds to one track.

In a disk player for recording and reproducing the video format signals as above described, the audio signals are frequency-modulated and recorded in multiple together with the video signals on the same track.

In such a disk player in the prior art, while the video signals on the same frame are reproduced repeatedly, i.e., during so-called still picture reproducing, output of the audio signals is inhibited so as to prevent generation of a rasping sound.

During editing, however, since the sound information is very important to determine the editing point, in a disk player of the prior art, the reproducing of the record information is done in the moving picture reproducing mode thereby the editing point must be determined, resulting in problems in the points of the working efficiency and the accuracy.

SUMMARY OF THE INVENTION

In view of the above-mentioned points, an object of the present invention is to provide a disk performance apparatus which can obtain the good sound information during the still or slow picture reproducing.

A disk performance apparatus according to the invention comprises means for reading the recorded signals on a disk which can record the video format signals and the audio signals on the same track, and performance control means for doing the performance operation specified by the track jumping of the signal reading point of the reading means, wherein audio signal processing means is provided for removing the higher components with frequency higher than the prescribed frequency of the audio signals included in the read outputs from the reading means and the lower components with frequency lower than that corresponding to the period of the track jump when the performance operation for repeatedly reading signals recorded on the same position of the disk is done by the operation control means.

In such constitution, during so-called still or slow picture reproducing, rapid level variation of the discontinuous point produced due to the track jump of the audio signals repeatedly read from the disk becomes the slow level variation, and the repeated frequency components produced due to the track jump done periodically can be removed.

BRIEF DESCRIPTION OF THE DRAWINGS

FIG. 2 is a flow chart illustrating operation of a processor in the apparatus of FIG. 1.

DESCRIPTION OF PREFERRED EMBODIMENTS

Figure 1:
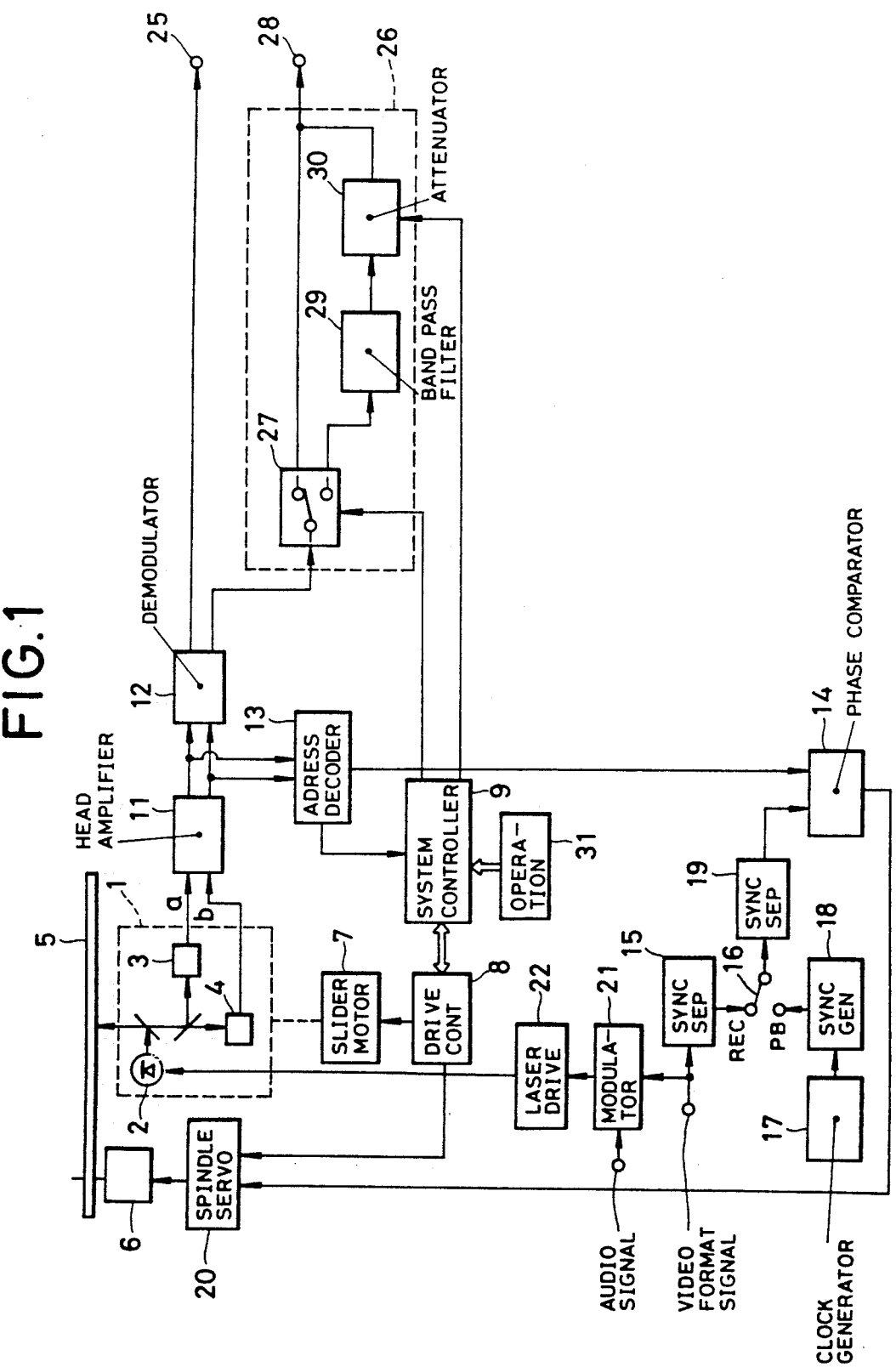
FIG. 1 is a block diagram illustrating an embodiment of the invention.

Embodiments of the invention will now be described in detail referring to the accompanying drawings.

In FIG. 1 showing an embodiment of the invention, a magneto-optical pickup 1 incorporates a semiconductor laser 2 as a light source, and photo detectors 3, 4 for receiving lights of both channels of the differential optical system and for doing the photoelectric conversion. The photo detectors 3, 4 detect laser lights through analyzers respectively which laser lights are generated from the semiconductor laser 2 and reflected by a recording surface of a disk 5 for example. One of the photo detectors 3, 4 detects the plus direction component of the Kerr rotational angle, and the other detects the minus direction component of the Kerr rotational angle. The pickup 1 is carried by a slider (not shown) moved in the radial direction of the disk 5 by a slider motor 7, and the information reading point (information reading light spot) of the pickup 1 is positioned freely in the radial direction of the disk 5. The disk 5 is driven for rotation by a spindle motor 6.

Although not shown, the pickup 1 further incorporates a focus actuator and a tracking actuator, and these two actuators are driven by a focus servo circuit and a tracking servo circuit respectively. Laser lights generated from the semiconductor laser 2 are focused accurately onto the recording surface of the disk 5 and a beam spot is formed by these two actuators, the focus servo circuit and the tracking servo circuit, and the beam spot is moved along a pregroove as the disk 5 is rotated.

The spindle motor 6 and the slider motor 7 are driven by a spindle servo system, a slider servo system or a drive controller 8. In response to command from a system controller 9, the drive controller 8 effects control of the spindle motor 6 and the slider motor 7, ON/-OFF control of the above-mentioned servo systems being not shown, jump control or the like.

Outputs a and b of the photo detectors 3 and 4 are supplied through a head amplifier 11 to a demodulation circuit 12 and an address detection circuit 13 respectively. The demodulation circuit 12 is provided at its input portion with a subtractor for subtracting one of the outputs a, b of the photo detectors 3, 4 by other, and the difference signal (a−b) by the subtractor is obtained as read RF signal based on information in the magneto-optic record. Those video format signal component and audio signal component in the read RF signal are separated by a band pass filter or the like, and the video format signal component and the audio signal component are frequency-demodulated respectively thereby reproducing video format signal and reproducing audio signal can be obtained. The address detection circuit 13 is constituted, for example, in an adder for adding to each other the outputs a and b of the photo detectors 3 and 4, and the sum signal (a+b) is obtained as address information previously recorded as preaddress pits. The address information signal is supplied to the system controller 9, and also becomes one input of a phase comparator 14.

As other input of the phase comparator 14, vertical synchronizing signal separated from the video format signals to be recorded is supplied during record (REC) mode, and vertical synchronizing signal generated based on clock pulses is supplied during reproducing (PB) mode. That is, composite synchronizing signal extracted from the recorded video format signals in a synchronizing extraction circuit 15 becomes input of one stationary contact REC of a changeover switch 16, and composite synchronizing signal generated from a synchronizing signal generator 18 based on clock pulses outputted from a clock generator 17 comprising a crystal oscillator or the like becomes input of other stationary contact PB of the changeover switch 16. Any one of the composite synchronizing signal is selected by the changeover switch 16 in response to changing control signal supplied from the system controller 9 in response to the operation mode of record (REC)/reproducing (PB), and vertical synchronizing signal is separated from the selected composite signal in a synchronizing separation circuit 19 and becomes other input of the phase comparator 14. The phase comparator 14 detects the phase difference between any one vertical synchronizing signal in response to the operation mode and the address information signal, and supplies it to a spindle servo circuit 20. In response to the phase difference signal, the spindle servo circuit 20 controls the rotation drive of the spindle motor 6.

In the recording mode, the video format signal and the audio signal to be recorded are supplied to a modulation circuit 21, and processed in frequency modulation respectively by two FM carrier waves different from each other in frequency. The FM signal outputted from the modulation circuit 21 is supplied to a laser control circuit 22, and the laser power of the semiconductor laser 2 within the pickup 1 is varied in response to the FM signal thereby the photomagnetic recording is done.

On the other hand, in the reproducing mode, the reproducing video format signal and the reproducing audio signal obtained in frequency demodulation by the demodulation circuit 12 are supplied to an output terminal 25 and an audio signal processing circuit 26 respectively. In the audio signal processing circuit 26, the reproducing audio signal is supplied to a changeover switch 27. Changing command signal is supplied from the system controller 9 to the control input terminal of the changeover switch 27. The changeover switch 27 supplies the reproducing audio signal to an output terminal 28 during absence of the changing command signal, and supplies the reproducing audio signal to a band pass filter 29 during presence of the changing command signal.

The band pass filter 29 has frequency characteristics so that components in the frequency band, for example, nearly at range of the interval of the human voice, that is, components in the frequency band from 500 Hz to 5 KHz only are allowed to pass. Output of the band pass filter 29 is supplied to an attenuator 30. The attenuator 30 attenuates the input signal at the attenuation coefficient corresponding to the sound volume data. Output of the attenuator 30 is supplied to the output terminal 28.

Consequently, only when the changing command signal is supplied to the changeover switch 27, the processing of the reproducing audio signal by the band pass filter 29 and the attenuator 30 is done.

The system controller 9 is constituted, for example, by a microcomputer comprising a processor, a ROM, a RAM or the like. The system controller 9 effects the arithmetic operation based on data or program stored in the ROM, the RAM or the like by the command in response to the key operation supplied from an operation unit 31, and then transmits the instruction signal such as play, jump, search to the drive controller 8 or the like.

Operation of the processor in the system controller 9 in the above-mentioned constitution will be described referring to the flow chart in FIG. 2.

When the play operation is done by execution of a main routine or the like, if the still picture reproducing command is issued from the operation unit 31, the processor is transferred to step S1 and the content of the prescribed address of the RAM to be used as the count value n is made 0. After the execution of step S1, the processor repeatedly performs the decision whether the vertical synchronizing signal v is outputted or not (step S2). Only when the decision is done that the vertical synchronizing signal v is outputted, the changing command signal is transmitted to the changeover switch 27 and the processing of the audio signal is started, and also the command of jumping by one track to the returning direction in the read direction is transmitted to the performance unit control circuit 5 (steps S3, S4).

After execution of step S4, the processor decides whether the vertical synchronizing signal v is outputted or not (step S5). In step S5, if the decision is done that the vertical synchronizing signal v is not outputted, the processor decides in sequence whether the volume up command from the operation unit 31 is issued or not and whether the volume down command is issued or not (steps S6 and S7).

In these steps S6 and S7, if the decision is done that the volume up command is issued, the processor increases the sound volume data to be transmitted to the attenuator 30 by prescribed value (step S8). If the decision is done that the volume down command is issued, the sound volume data to be transmitted to the attenuator 30 is decreased by prescribed value (step S9), and the processor is transferred to step 5 again. In steps S6 and S7, if the decision is done that neither the volume up command nor the volume down command is issued, the processor is immediately transferred to step S5.

In step S5, if the decision is done that the vertical synchronizing signal v is outputted, the processor adds 1 to the count value n (step S10), and decides whether the count value n is equal to 2 or not (step S11). In step S11, if the decision is done that the count value is not equal to 2, the processor is transferred to step S5 again. In step S11, if the decision is done that the count value n is equal to 2, the processor transmits the command of jumping by one track to the returning direction in the read direction to the performance unit control circuit 8 (step S12), and the count value is made 0 (step S13).

After the execution of step S13, the processor decides whether the release command of the still picture reproducing from the operation unit 31 is issued or not (step S14). In step S14, if the decision is done that the release command of the still picture reproducing is not issued, the processor is transferred to step S5 again. In step S14, if the decision is done that the release command of the still picture reproducing is issued, the processor stops the transmission of the changing command signal to the changeover switch 27 and stops the processing of the reproducing audio signal (step S15), and the execution of the routine executed immediately before the transferring to the step S1 is started again.

In steps S4–S14 in the above-mentioned operation, every time the reading of portion recording the video signal by one frame is done, jumping by one track to the returning direction in the read direction is done and the still picture reproducing for repeatedly reading the same frame is done. Before the still picture reproducing, since the changing command signal is supplied to the changeover switch 27 by step S3, during the still picture reproducing, the reproducing audio signal is supplied through the band pass filter 29 and the attenuator 30 to the output terminal. Consequently, during the still picture reproducing, the lower components less than 500 Hz of the reproducing audio signal and the higher components more than 5 KHz can be removed by the band pass filter 29.

During the still picture reproducing, the track jump is done in one frame period, and the repeated frequency component of 30 Hz generated by the track jump is mixed in the reproducing audio signal, but the repeated frequency component of 30 Hz is removed by the band pass filter 29. Discontinuous point is produced in the reproducing audio signal due to the track jump, and the instantaneous level of the reproducing audio signal is rapidly varied in the discontinuous point and noise of quite high frequency in comparison to the voice frequency is generated, but the noise of quite high frequency is removed by the band pass filter 29 and the variation of the instantaneous level of the reproducing audio signal becomes slow.

Accordingly the reproducing sound obtained during the still picture reproducing can be prevented from becoming a rasping sound, and the reproducing sound with little incompatibility in the auditory sensation can be obtained.

Also in steps S6–S9, since the attenuation coefficient in the attenuator 30 can be varied, the sound volume of the reproducing sound during the still picture reproducing can be reduced in comparison to that during the ordinary reproducing and the incompatibility in the auditory sensation can be suppressed.

In the embodiment, the band pass filter 29 has frequency characteristics so that only components within the frequency band from 500 Hz to 5 KHz are allowed to pass, but any frequency characteristics of the band pass filter 29 may be set as long as higher frequency components in comparison to the voice signal frequency and the frequency components corresponding to the track jump frequency can be removed.

Although the case of performing the magneto-optic disk has been described, it is clear that the invention can be applied to a player of performing a disk of additive type, a player of performing any of the additive type disk and the photomagnetic disk, and other disk player.

Although the disk carries thereon pre-address signals in the form of pre-pits in the above-mentioned embodiment according to the subject invention, existence of those pre-address signals on a disk is not an absolute requirement for the subject invention. The address information may be carried by the so-called VITC i.e. a time-code inserted within the V blanking period, which is used in a VTR system. Furthermore, the address information may be recorded by wobbling of a pre-grove. In the former case, a subtractor should be used as an address detector in place of the demodulator 12. In the latter case, an address detecting circuit should be used which has a construction similar to the usual tracking error signal generator.

In addition, multiplication of the video format signal and the audio signal may done through the time-axis compression technique.

In summary the subject invention provides a disk player which processes the audio signal to delete high and low frequencies with predetermined region during an operational mode for reading repeatedly an information signal at a certain frame. It is clear that the particular operational mode is not only the still picture reproduction but also the slow picture reproduction.

As above described in detail, the disk performance apparatus according to the invention comprises reading means for reading the recorded signal of the disk which can record the video format signals and the audio signals on the same track, and the performance control means for effecting the performance operation specified by the track jumping of the signal reading point of the reading means, wherein audio signal processing means is provided for removing the higher components with frequency higher than the prescribed frequency of the audio signals included in the read output from the reading mean and the lower components with frequency lower than that corresponding to the period of the track jump when the performance operation for repeatedly reading signals recorded on the same position of the disk is done by the operation control means. Consequently, in the disk performance apparatus of the invention, the rapid level variation of the discontinuous point produced by the track jump of the audio signal repeatedly read from the disk during the still or slow picture reproducing is made the slow level variation, and the repeated frequency component produced due to the track jump periodically done can be removed thereby the reproducing sound with little incompatibility in the auditory sensation can be obtained. Accordingly, in the disk performance apparatus of the invention, the information sufficient to determine the editing point can be obtained during the still or slow picture reproducing, thereby the working efficiency and the accuracy in the editing work can be improved.

What is claimed is:

1. A disk performance apparatus comprising:
   reading means for reading signals recorded on a disk, the disk having a video format signal and audio signals on the same track, the reading means having at least one signal reading point;
   performance control means for effecting a performance operation specified by a track jumping of the signal reading point; and
   audio signal processing means having means for switching transmission of audio read output signals from the reading means either directly to an output terminal or indirectly to the output terminal through a band pass filter such that, when the performance control means effects the performance operation having track jumping of the signals reading point to repeatedly read signals recorded on a portion of said disk, said audio signal processing means can switch transmission of the audio signals to the band pass filter rather than directly to the output terminal to thereby remove higher components of the audio read output signals having a frequency higher than a prescribed frequency, and can also remove lower components of the audio read output signals having a frequency lower than that corresponding to the period of the track jumping.

2. A disk performance apparatus as set forth in claim 1, wherein said audio signal processing means includes level adjusting means for adjusting the level of the audio read output signals.

3. A disk performance apparatus as set forth in claim 2, wherein the level adjusting means is connected to an output of the band pass filter such that the level adjusting means only adjusts the level of the audio read output signals having passed through the band pass filter and does not effect the audio read output signals transmitted directly to the output terminal from the reading means.

4. A disk performance apparatus as set forth in claim 3, wherein the level adjusting means includes an attenuator having an attenuation coefficient that can be varied to reduce the level of the audio read output signals transmitted to the output terminal through the attenuator.

* * * * *